(12) United States Patent
Tsuchihashi (10) Patent No.: US 12,316,185 B2
(45) Date of Patent: May 27, 2025

(54) ACTUATOR

(71) Applicant: NIDEC SANKYO CORPORATION, Nagano (JP)

(72) Inventor: Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 314 days.

(21) Appl. No.: 17/958,418

(22) Filed: Oct. 2, 2022

(65) Prior Publication Data

US 2023/0121657 A1    Apr. 20, 2023

(30) Foreign Application Priority Data

Oct. 20, 2021   (JP) .................... 2021-171562

(51) Int. Cl.
*H02K 33/02*   (2006.01)
*B06B 1/04*    (2006.01)

(52) U.S. Cl.
CPC .......... *H02K 33/02* (2013.01); *B06B 1/045* (2013.01)

(58) Field of Classification Search
CPC ........ H02K 33/02; H02K 33/04; H02K 33/06; H02K 33/08; H02K 35/02; H02K 35/04; H02K 1/24; H02K 5/24; H02K 7/061; H02K 7/065; H02K 2205/12; H02K 2213/03; B06B 1/045

USPC ........................................................ 310/15
See application file for complete search history.

(56) References Cited

U.S. PATENT DOCUMENTS

2018/0294690 A1\* 10/2018 Takeda .................. H02K 33/16
2021/0305878 A1\* 9/2021 Hinata .................. H02K 33/16

FOREIGN PATENT DOCUMENTS

JP           2021136783           9/2021

\* cited by examiner

*Primary Examiner* — Alexander A Singh
*Assistant Examiner* — Charlie Frank Mann, Jr.
(74) *Attorney, Agent, or Firm* — JCIPRNET (57) ABSTRACT

An actuator includes a connection body which is connected with a support body and a movable body and is provided with elasticity and/or viscoelasticity, and a magnetic drive mechanism structured to move the movable body with respect to the support body. The movable body may include a support shaft, a tube-shaped part surrounding a magnet, a first inner frame part on one side of the tube-shaped part, and a second inner frame part on the other side of the tube-shaped part. The support body may include a first outer frame part, a second outer frame part, and a case surrounding the first and the second outer frame parts and the tube-shaped part. The connection body includes first and second connection bodies between the first and second inner frame parts and the first and second outer frame parts, and a third connection body between the tube-shaped part and the case.

4 Claims, 4 Drawing Sheets

ACTUATOR

CROSS REFERENCE TO RELATED APPLICATION

The present invention claims priority under 35 U.S.C. § 119 to Japanese Application No. 2021-171562 filed Oct. 20, 2021, the entire content of which is incorporated herein by reference.

FIELD OF THE INVENTION

The disclosure may relate to an actuator in which a movable body is relatively moved with respect to a support body.

BACKGROUND

An actuator is disclosed which includes a connection body connected with a movable body and a support body and a magnetic drive mechanism structured to move the movable body with respect to the support body, and in which a viscoelastic body such as silicone gel is used as the connection body. In the above actuator, the movable body includes a support shaft whose outer peripheral face is fixed with a magnet and a yoke which is fixed to an end face of the magnet. The support body includes a case in a tube shape and a coil holder which is fixed to the case. The coil holder holds a coil which is disposed on an outer peripheral side with respect to the magnet. The connection body is disposed at two positions on both ends of the support shaft and connects the support body with the movable body at the two positions separated in an axial line direction.

In the above, the connection body is disposed in spaces between inner frames in a tube shape (first fixing member and second fixing member) fixed at both ends of the support shaft and outer frames (first ring-shaped member and second ring-shaped member) which are fixed to the case or the coil holder and connects the inner frames with the outer frames.

In the above structure, when the movable body is vibrated in an axial line direction of the support shaft, the inner frame in a tube shape and the outer frame are relatively moved to each other in the axial line direction, and the connection body disposed in the space is deformed in a shearing direction. A viscoelastic body which is used as the connection body is deformed in a shearing direction and, in addition, the viscoelastic body is capable of being deformed in an expansion and contraction direction. Therefore, the movable body is capable of moving in a direction different from a vibration direction and, when such a movement occurs, a drive force of the magnetic drive mechanism is dispersed to generate loss of the drive force and vibration having necessary magnitude may be unable to obtain. Further, when an impact due to dropping or the like is applied, the movable body may be moved in a direction different from the vibration direction to collide with the support body and may be damaged.

SUMMARY

According to an exemplary embodiment of the disclosure, there may be provided an actuator including a support body, a movable body, a connection body which is connected with the support body and the movable body and is provided with at least one of elasticity and viscoelasticity, and a magnetic drive mechanism which includes a magnet and a coil and is structured to relatively move the movable body with respect to the support body. One of the movable body and the support body includes a support shaft which supports one of the magnet and the coil on an inner peripheral side with respect to the other of the movable body and the support body, a tube-shaped part which surrounds an outer peripheral side of the one of the magnet and the coil, a first inner frame part which surrounds an outer peripheral side of the support shaft on one side in an axial line direction of the tube-shaped part, and a second inner frame part which surrounds the outer peripheral side of the support shaft on the other side in the axial line direction of the tube-shaped part. The other of the movable body and the support body includes a first outer frame part which faces the first inner frame part in a radial direction, a second outer frame part which faces the second inner frame part in the radial direction, and a case in a tube shape which surrounds outer peripheral sides of the first outer frame part, the second outer frame part and the tube-shaped part. The connection body includes a first connection body in a tube shape which is disposed in a space between the first inner frame part and the first outer frame part, a second connection body in a tube shape which is disposed in a space between the second inner frame part and the second outer frame part, and a third connection body in a tube shape which is disposed in a space between the tube-shaped part and the case.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
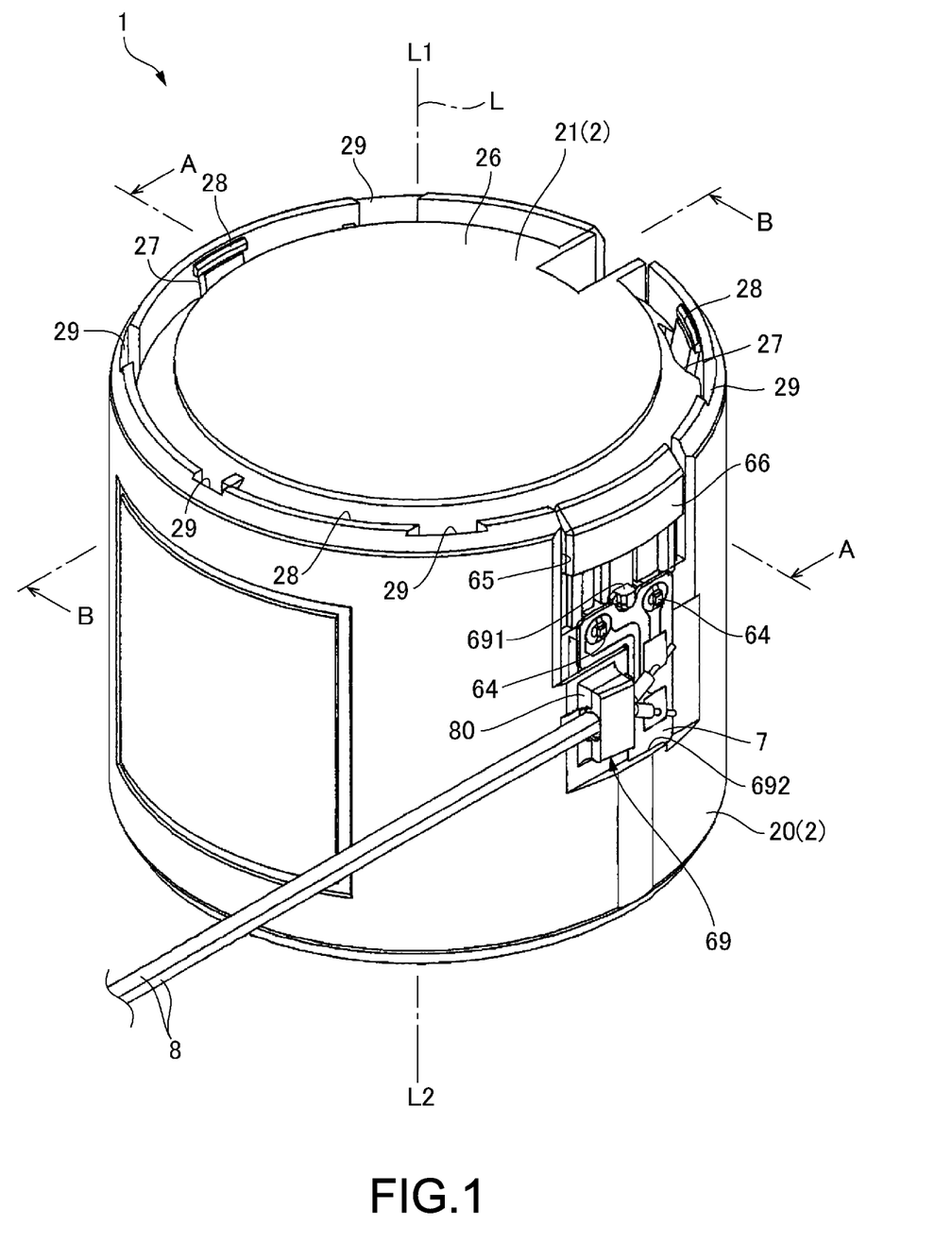
FIG. 1 is a perspective view showing an actuator in accordance with an embodiment of the disclosure.
Figure 2:
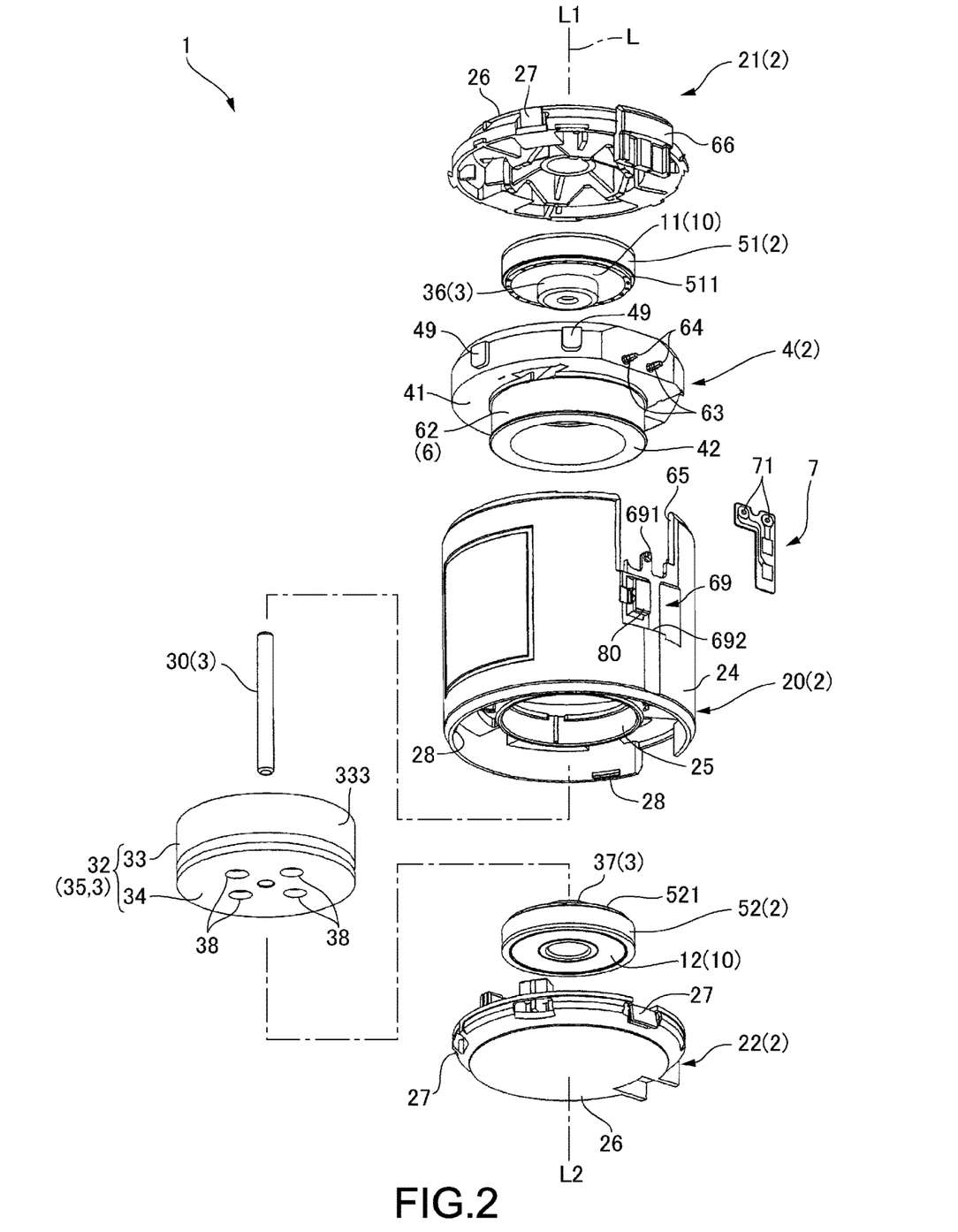
FIG. 2 is an exploded perspective view showing the actuator in FIG. 1.
Figure 3:
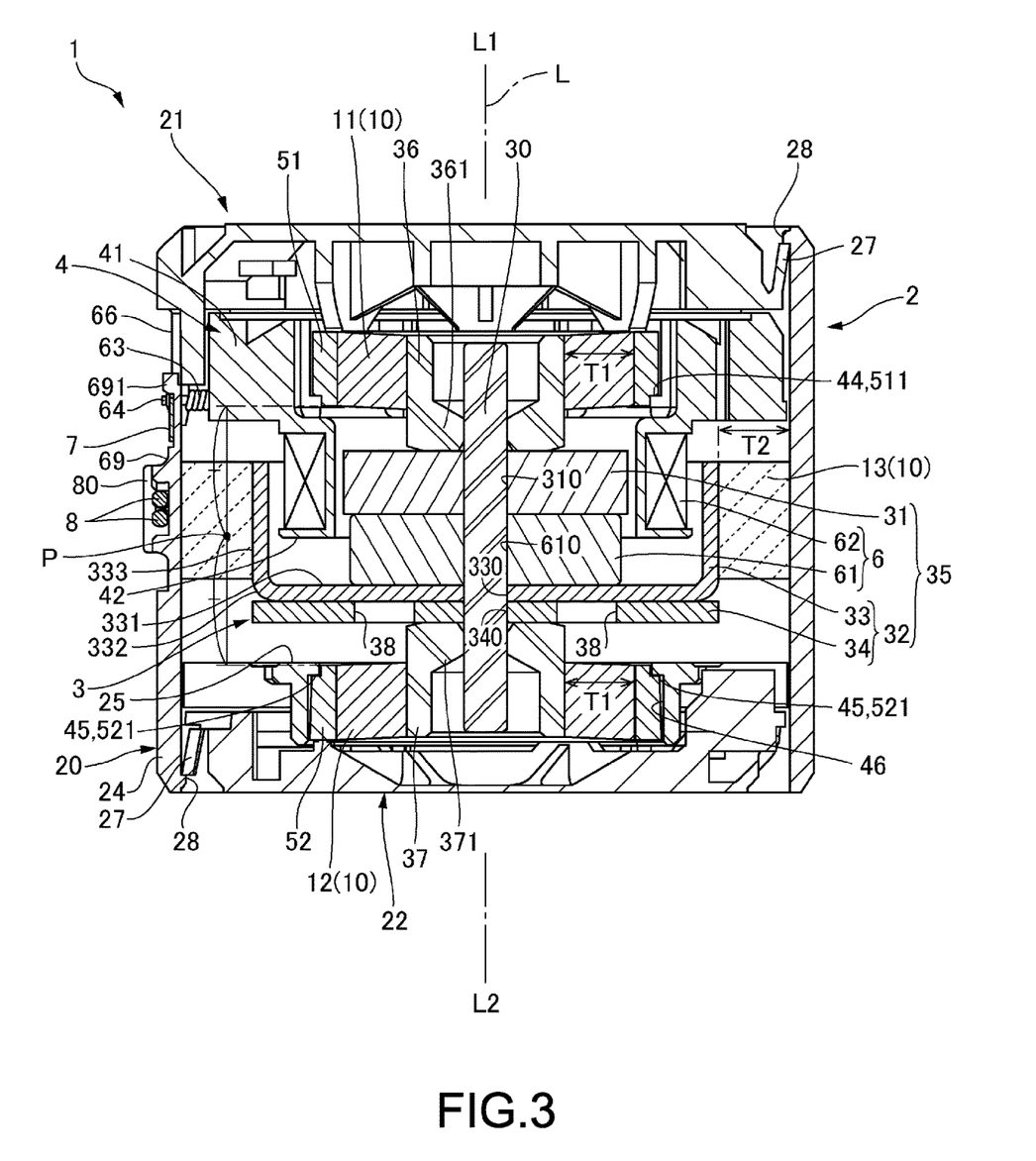
FIG. 3 is a cross-sectional view showing the actuator in FIG. 1 ("A-A" cross-sectional view in FIG. 1).
Figure 4:
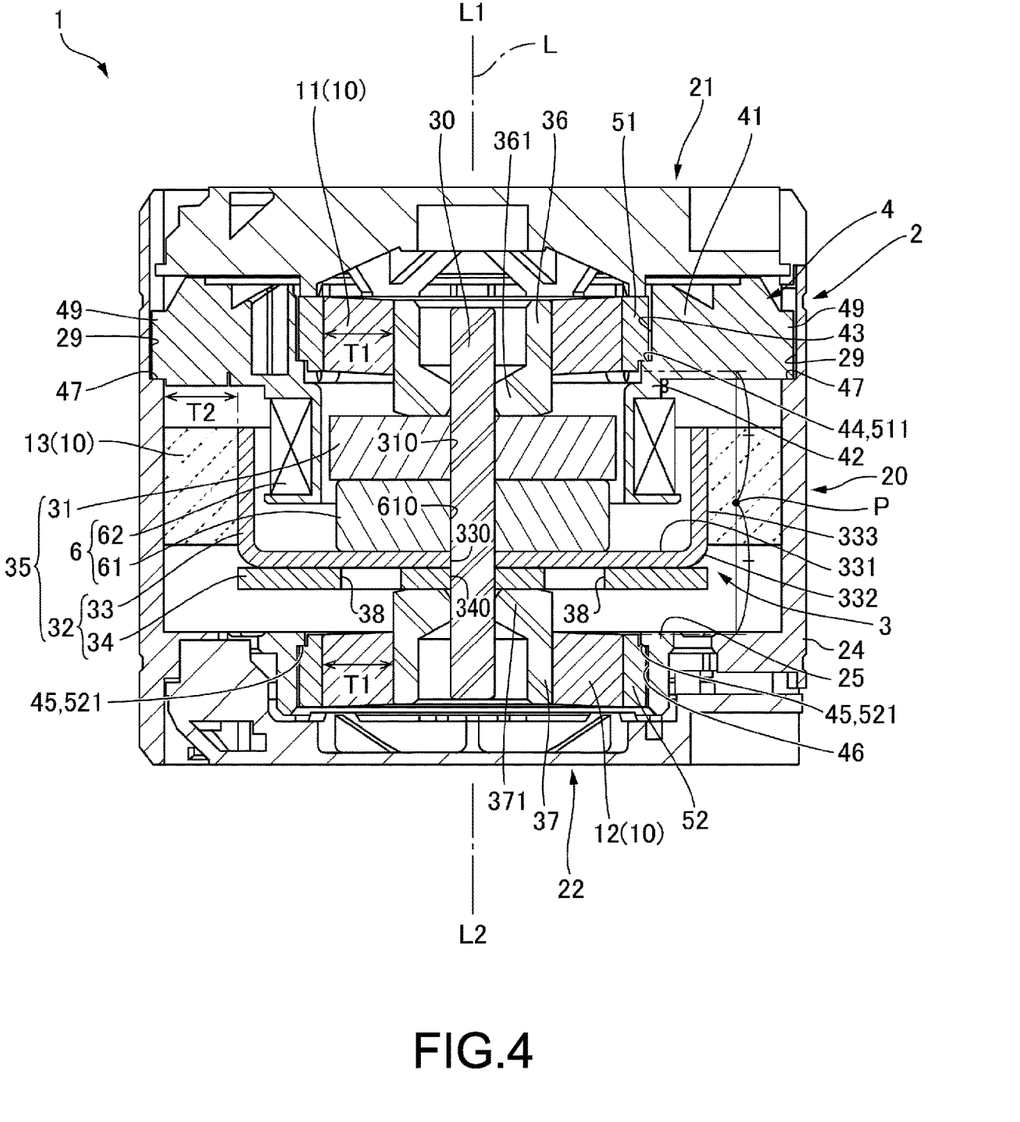
FIG. 4 is a cross-sectional view showing the actuator in FIG. 1 ("B-B" cross-sectional view in FIG. 1).

An embodiment of the disclosure will be described below with reference to the accompanying drawings. FIG. 1 is a perspective view showing an actuator 1 in accordance with an embodiment of the disclosure. FIG. 2 is an exploded perspective view showing the actuator 1 in FIG. 1. FIGS. 3 and 4 are cross-sectional views showing the actuator 1 in FIG. 1. FIG. 3 is a cross-sectional view showing the actuator 1 which is cut at the "A-A" position in FIG. 1. FIG. 4 is a cross-sectional view showing the actuator 1 which is cut at the "B-B" position in FIG. 1 and is cut in a direction perpendicular to the state in FIG. 3. In the following descriptions, a direction in which a center axial line "L" of a movable body 3 is extended is defined as an axial line direction, and one side in the axial line direction is referred to as "L1" and the other side in the axial line direction is referred to as "L2".

As shown in FIGS. 1 through 4, the actuator 1 includes a support body 2, a movable body 3, a connection body 10 connected with the support body 2 and the movable body 3, and a magnetic drive mechanism 6 structured to relatively move the movable body 3 with respect to the support body 2. The connection body 10 is provided with at least one of elasticity and viscoelasticity. In this embodiment, the magnetic drive mechanism 6 includes a magnet 61 disposed on the movable body 3 and a coil 62 disposed on the support body 2, and the magnetic drive mechanism 6 is structured to relatively move the movable body 3 in the axial line direction with respect to the support body 2. As shown in FIGS. 3 and 4, the movable body 3 is connected with the support body 2 through the connection bodies 10 at three positions, i.e., at an end part on one side "L1" in the axial line direction, at an end part on the other side "L2" in the axial line direction, and at a center in the axial line direction.

As shown in FIGS. 2 through 4, the support body 2 includes a case 20 in a tube shape, a first lid member 21 which closes an opening of the case 20 on one side "L1" in the axial line direction, a second lid member 22 which closes an opening of the case 20 on the other side "L2" in the axial line direction, and a coil holder 4 which is disposed between the first lid member 21 and the second lid member 22 on an inner peripheral side with respect to the case 20. In this embodiment, the case 20, the first lid member 21, the second lid member 22 and the coil holder 4 are made of resin. Further, the support body 2 includes a first outer frame member 51 fitted to an inner peripheral side of the coil holder 4 and a second outer frame member 52 fitted to an inner peripheral side of the case 20 at a position separated from the first outer frame member 51 on the other side "L2" in the axial line direction. Each of the first outer frame member 51 and the second outer frame member 52 is connected with the movable body 3 through the connection body 10. Further, a substantially center portion in the axial line direction of the case 20 is connected with the movable body 3 through the connection body 10.

As shown in FIG. 2, the coil holder 4 is provided with a first outer frame member fixing part 41 in a ring shape and a body part 42 which is protruded from the first outer frame member fixing part 41 to the other side "L2" in the axial line direction, and the coil 62 is disposed around the body part 42. End parts of a coil wire 63 extended from the coil 62 are bound with two terminal pins 64 which are protruded to an outer side in the radial direction from the first outer frame member fixing part 41 of the coil holder 4. As shown in FIG. 1, the terminal pins 64 are protruded to an outer side of the case 20 and are connected with a wiring circuit board 7.

As shown in FIG. 4, the coil holder 4 is provided with a first step part 44 which positions the first outer frame member 51 in the axial line direction. The first outer frame member fixing part 41 surrounds an outer peripheral side of the first outer frame member 51. An inner peripheral face of the first outer frame member fixing part 41 is provided with a first recessed part 43 which is recessed to the other side "L2" in the axial line direction, and the first outer frame member 51 is press-fitted to the first recessed part 43. The first step part 44 is provided at an end part of the first recessed part 43 on the other side "L2" in the axial line direction. In this embodiment, a ring-shaped step part 511 defined on an outer peripheral face of the first outer frame member 51 is abutted with the first step part 44 in the axial line direction.

The case 20 includes a case main body 24 in a cylindrical tube shape and a second outer frame member fixing part 25 which is disposed on an inner peripheral side of the case main body 24. The second outer frame member fixing part 25 is disposed at a position separated to the other side "L2" in the axial line direction with respect to the coil holder 4. As shown in FIGS. 2 and 4, the second outer frame member fixing part 25 is protruded to an inner peripheral side from an inner peripheral face of the case main body 24 and is integrally molded with the case main body 24.

The case 20 is provided with a second step part 45 which positions the second outer frame member 52 in the axial line direction. As shown in FIGS. 3 and 4, an inner peripheral face of the second outer frame member fixing part 25 is provided with a second recessed part 46 which is recessed to one side "L1" in the axial line direction, and the second outer frame member 52 is press-fitted to the second recessed part 46. The second step part 45 is provided at an end part of the second recessed part 46 on one side "L1" in the an axial line direction. In this embodiment, a ring-shaped step part 521 defined on an outer peripheral face of the second outer frame member 52 is abutted with the second step part 45 in the axial line direction.

Further, the case 20 is provided with a third step part 47 which positions the coil holder 4 in the axial line direction. As shown in FIG. 4, the third step part 47 is defined on an inner peripheral face of the case main body 24. As shown in FIGS. 1 and 4, an inner peripheral face of the case main body 24 to which the coil holder 4 is fitted is provided with a plurality of groove parts 29 which are extended in the axial line direction, and the third step part 47 is defined at an end part of each of the groove parts 29 on the other side "L2" in the axial line direction. As shown in FIG. 2, the coil holder 4 is provided with a plurality of protruded parts 49 which are protruded from an outer peripheral face of the first outer frame member fixing part 41. When the support body 2 is to be assembled, each of the protruded parts 49 of the coil holder 4 is fitted to each of the groove parts 29 of the case main body 24 from one side "L1" in the axial line direction and is abutted with the third step part 47 in the axial line direction. As a result, the coil holder 4 is press-fitted and fixed to the case main body 24, and the coil holder 4 is positioned in the axial line direction.

As shown in FIGS. 3 and 4, the first lid member 21 is fixed to the case main body 24 from one side "L1" in the axial line direction with respect to the first outer frame member fixing part 41 provided in the coil holder 4. Further, the second lid member 22 is fixed to the case main body 24 from the other side "L2" in the axial line direction with respect to the second outer frame member fixing part 25. As shown in FIG. 2, each of the first lid member 21 and the second lid member 22 is provided with a lid part 26 which is circular when viewed in the axial line direction and a plurality of engaging parts 27 which are disposed at an outer peripheral edge of the lid part 26 at equal intervals in a circumferential direction. In this embodiment, each of the first lid member 21 and the second lid member 22 is provided with three engaging parts 27. The engaging part 27 is a claw part which is inclined and extended in a direction expanded to an outer peripheral side from the lid part 26.

The engaging part 27 is elastically deformed in a radial direction and is pushed into an inner peripheral side of the case main body 24 together with the lid part 26. The case 20 is provided with a restriction part 28 which restricts the engaging part 27 from disengaging from an inner side of the case 20. The restriction part 28 is a protruded part which is protruded from an end part of the case main body 24 to the inner peripheral side. The restriction part 28 is abutted with a tip end of the engaging part 27 in the axial line direction. The first lid member 21 and the second lid member 22 are fixed to the case 20 by using both of an engagement structure of the engaging parts 27 and the restriction parts 28 and fixing by an adhesive.

As shown in FIGS. 1 and 2, the support body 2 is provided with a cut-out part 65, which is defined by cutting out an edge of the case 20 on one side "L1" in the axial line direction to the other side "L2" in the axial line direction, and a board fixing part 69 which is provided on the other side "L2" with respect to the cut-out part 65. The cut-out part 65 is covered by a cover 66 which is extended to the other side "L2" in the axial line direction from a part in a circumferential direction of an outer peripheral edge of the first lid member 21. The wiring circuit board 7 is engaged with a claw part 691, which is provided at an end part of the board fixing part 69 on one side "L1" in the axial line direction, and an engaging groove 692 which is provided at an end part of the board fixing part 69 on the other side "L2" in the axial line direction and, in addition, the wiring circuit board 7 is fixed to the board fixing part 69 by an adhesive. The wiring circuit board 7 is connected with lead wires 8 for power feeding to the coil 62. The board fixing part 69 is provided with a lead wire holding part 80 which holds the lead wires 8 at a position adjacent to the wiring circuit board 7 in a circumferential direction.

When the case 20 and the coil holder 4 are assembled, the first outer frame member fixing part 41 of the coil holder 4 is disposed on an inner peripheral side of the cut-out part 65 of the case 20. Root portions of two terminal pins 64 extended to an outer peripheral side from the first outer frame member fixing part 41 are bound with the coil wires 63 which are extended from the coil 62. The two terminal pins 64 are protruded from a space between an edge on the other side "L2" of the cut-out part 65 and the cover 66 and are passed through two holes 71 which are provided in the wiring circuit board 7 fixed to the board fixing part 69, and the two terminal pins 64 are electrically connected with the lead wires 8 through lands provided at edges of the holes 71.

As shown in FIGS. 2 through 4, the movable body 3 includes a support shaft 30 which is extended in the axial line direction at a center in the radial direction of the support body 2. The support shaft 30 is fixed with a magnet 61 and a yoke 35 by a first inner frame member 36 in a tube shape and a second inner frame member 37 in a tube shape. The support shaft 30 is a round bar made of metal. Each of the first inner frame member 36 and the second inner frame member 37 is a circular tube body made of metal and is provided with a circular through hole.

As shown in FIGS. 3 and 4, an inner peripheral face of the first inner frame member 36 is provided with a ring-shaped protruded part 361 which is protruded to an inner side in the radial direction at an end part on the other side "L2" in the axial line direction. Therefore, when the first inner frame member 36 is press-fitted to the support shaft 30, the support shaft 30 is press-fitted to the ring-shaped protruded part 361. Further, an inner peripheral face of the second inner frame member 37 is provided with a ring-shaped protruded part 371 which is protruded to an inner side in the radial direction at an end part on one side "L1" in the axial line direction. Therefore, when the second inner frame member 37 is press-fitted to the support shaft 30, the support shaft 30 is press-fitted to the ring-shaped protruded part 371.

As shown in FIGS. 3 and 4, the magnet 61 is fixed to an outer peripheral face of the support shaft 30 at a substantially center in the axial line direction. The magnet 61 is circular when viewed in the axial line direction. A center of the magnet 61 is provided with a shaft hole 610 through which the support shaft 30 is penetrated. The yoke 35 includes a first yoke 31, which is overlapped with the magnet 61 on one side "L1" in the axial line direction, and a second yoke 32 which is overlapped with the magnet 61 on the other side "L2" in the axial line direction.

A center of the first yoke 31 is provided with a shaft hole 310 through which the support shaft 30 is penetrated. In this embodiment, the first yoke 31 is a magnetic plate whose outside diameter dimension is slightly larger than an outside diameter dimension of the magnet 61, and an outer peripheral face of the first yoke 31 is protruded to an outer side in the radial direction with respect to an outer peripheral face of the magnet 61. The first yoke 31 is fixed to a face on one side "L1" of the magnet 61 by a method such as adhesion.

As shown in FIGS. 2, 3 and 4, the second yoke 32 is structured of two members, i.e., a first magnetic member 33 in a cup shape and a second magnetic member 34 in a circular plate shape. The first magnetic member 33 is provided with an end plate part 331 in a circular shape which is provided with a shaft hole 330 through which the support shaft 30 is penetrated, a bent part 332 which is bent from an outer edge of the end plate part 331 to one side "L1" in the axial line direction, and a tube-shaped part 333 in a cylindrical shape which is extended from the bent part 332 to one side "L1" in the axial line direction. The end plate part 331 is fixed to an end face of the magnet 61 on the other side "L2" in the axial line direction. The second magnetic member 34 is provided with a shaft hole 340 through which the support shaft 30 is penetrated and is fixed to the end plate part 331 of the first magnetic member 33 from an opposite side to the magnet 61.

In the movable body 3, the first inner frame member 36 and the second inner frame member 37 are fixed to the support shaft 30 on both sides in the axial line direction with respect to the magnet 61 and the yoke 35 in a state that the support shaft 30 is penetrated through the shaft holes 310, 610, 330 and 340 of the magnet 61 and respective members structuring the yoke 35. As a result, the first inner frame member 36 supports the magnet 61 and the yoke 35 from one side "L1" in the axial line direction, and the second inner frame member 37 supports the magnet 61 and the yoke 35 from the other side "L2" in the axial line direction and, in this manner, the magnet 61 and the yoke 35 are fixed to the support shaft 30.

As shown in FIGS. 3 and 4, the tube-shaped part 333 of the first magnetic member 33 is separated in the radial direction from an outer peripheral face of the magnet 61 and an outer peripheral face of the first yoke 31. A body part 42 of the coil holder 4 is provided in a cylindrical shape and is disposed in a space between the outer peripheral faces of the magnet 61 and the first yoke 31 and the tube-shaped part 333 of the first magnetic member 33. Therefore, the coil 62 wound around the body part 42 is disposed in the space between the tube-shaped part 333 and the outer peripheral face of the first yoke 31. Further, an end part on the other side "L2" of the coil 62 is disposed in the space between the tube-shaped part 333 and the outer peripheral face of the magnet 61.

In this embodiment, an outside diameter of the second magnetic member 34 and an outside diameter of the tube-shaped part 333 are the same dimension as each other, and an outer peripheral end face of the second magnetic member 34 is located on the same face as the outer peripheral face of the tube-shaped part 333. Therefore, in the second yoke 32, a thickness of the outer peripheral end part where magnetic flux density is high is secured, and a magnetic path is defined in a portion where magnetic flux density is high.

A resonance frequency of the actuator 1 is determined by an expression including a weight of the movable body 3 and a spring constant of the connection body 10. As shown in FIG. 2, the second magnetic member 34 is provided with circular through-holes 38. In this embodiment, the through-hole 38 is provided at four positions. When a hole diameter of the through-hole 38 and the number of the through-holes 38 are appropriately set, a weight of the movable body 3 is appropriately set without changing an outer shape of the second magnetic member 34. In other words, the second magnetic member 34 is provided with a weight adjustment function for appropriately setting a weight of the movable body 3.

As shown in FIGS. 3 and 4, the connection body 10 includes a first connection body 11 in a tube shape which is disposed at an end part of the movable body 3 on one side "L1" in the axial line direction, a second connection body 12 in a tube shape which is disposed at an end part of the movable body 3 on the other side "L2" in the axial line direction, and a third connection body 13 in a tube shape which is disposed at a substantially center of the movable body 3 in the axial line direction. The first inner frame member 36 of the movable body 3 faces the first outer frame member 51 of the support body 2 in the radial direction. The first connection body 11 is disposed in a space between the first inner frame member 36 and the first outer frame member 51. The second inner frame member 37 of the movable body 3 faces the second outer frame member 52 of the support body 2 in the radial direction. The second connection body 12 is disposed in a space between the second inner frame member 37 and the second outer frame member 52. Further, the tube-shaped part 333 of the second yoke 32 of the movable body 3 faces an inner peripheral face of the case 20 in the radial direction. The third connection body 13 is disposed in a space between the tube-shaped part 333 and the case 20.

The first connection body 11 and the second connection body 12 are provided in the same shape as each other and are reversely disposed in the axial line direction. A diameter of the third connection body 13 is larger than those of the first connection body 11 and the second connection body 12. In this embodiment, a thickness "T2" in the radial direction of the third connection body 13 is the same as a thickness "T1" in the radial direction of the first connection body 11 and the second connection body 12. Further, in this embodiment, the third connection body 13 is connected with the entire range in the axial line direction of an outer peripheral face of the tube-shaped part 333. In other words, a length in the axial line direction of the third connection body 13 is the same as a length in the axial line direction of the tube-shaped part 333. Further, a position in the axial line direction of the third connection body 13 is located at a position including a middle point "P" between an end on the other side "L2" of the first connection body 11 and an end on one side "L1" of the second connection body 12.

The connection body 10 is defined by a viscoelastic body. For example, as the connection body 10, the following materials may be used which include a gel state member comprised of silicone gel or the like, various rubber materials such as natural rubber, diene-based rubber (for example, styrene butadiene rubber, isoprene rubber, butadiene rubber, chloroprene rubber and acrylonitrile butadiene rubber), non-diene-based rubber (for example, butyl rubber, ethylene propylene rubber, ethylene propylene diene rubber, urethane rubber, silicone rubber and fluorine-containing rubber) and thermoplastic elastomer, and their denatured materials. Further, the viscoelastic body which may be used as the connection body 10 may be a composite member which is defined by combining a gel state member, rubber or the denatured material with an elastic body such as a spring.

In this embodiment, each of the first connection body 11, the second connection body 12 and the third connection body 13 is a gel state member which is defined by molding gel material and is joined with the movable body 3 and the support body 2 by adhesiveness of the gel state member itself or an adhesive. More specifically, the first connection body 11, the second connection body 12 and the third connection body 13 are respectively made of silicone gel whose penetration degree is 90 degrees through 110 degrees and are gel state members having the same characteristics.

Each of the first connection body 11 and the second connection body 12 is produced by a method in which gel material is filled in a mold and is hardened (casting). When the first connection body 11 is to be molded, the first outer frame member 51 and the first inner frame member 36 are coaxially positioned by a jig to form a ring-shaped space between the first outer frame member 51 and the first inner frame member 36, and gel material is filled in this space and then heated and cured. As a result, the first connection body 11 is joined with the inner peripheral face of the first outer frame member 51 and the outer peripheral face of the first inner frame member 36 by adhesiveness of the gel state member itself.

In this case, the joining strength is able to be increased by applying a joining accelerating agent such as primer to the inner peripheral face of the first outer frame member 51 and the outer peripheral face of the first inner frame member 36 before the gel material is filled. The second connection body 12 is similarly molded so that a ring-shaped space is defined between the second outer frame member 52 and the second inner frame member 37 and gel material is filled in the space and then heated and cured. As described above, the first connection body 11 and the second connection body 12 are respectively joined with the inner frames and the outer frames to make as components and thus, when the actuator 1 is to be assembled, the support body 2 and the movable body 3 are able to be connected with each other without performing a step in which the first connection body 11 and the second connection body 12 are adhesively bonded.

The third connection body 13 is, similarly to the first connection body 11 and the second connection body 12, produced by a method in which gel material is filled in a mold and is hardened (casting). For example, the first magnetic member 33 is positioned on an inner side with respect to the case 20, and gel material is filled between the case 20 and the tube-shaped part 333 and then heated and cured. In this case, a joining strength of the case 20 with the third connection body 13 and a joining strength of the tube-shaped part 333 with the third connection body 13 are able to be increased by applying a joining accelerating agent such as primer.

Alternatively, a method may be used in which a mold member is positioned on an inner side with respect to the case 20, gel material is filled between the case 20 and the mold member and heated and cured to be molded and, after that, the mold member is detached, and then, the tube-shaped part 333 is inserted to an inner side of the third connection body 13 when the support body 2 and the movable body 3 are to be assembled, and the third connection body 13 is joined with an outer peripheral face of the tube-shaped part 333 by an adhesive.

In this embodiment, the tube-shaped part 333 with which the third connection body 13 is joined is provided in the first magnetic member 33 structuring the yoke 35. However, it may be structured that a third inner frame member separated from the first magnetic member 33 is attached to an outer peripheral side of the first magnetic member 33 to structure a tube-shaped part by the third inner frame member. In this case, a gel state member is able to be molded between the third inner frame member (tube-shaped part) and the case 20 to structure a component. Therefore, when the actuator 1 is to be assembled, a step for adhesively bonding the third connection body is not required.

In the actuator 1, an electric current is supplied to the coil 62, the magnetic drive mechanism 6 generates a drive force for driving the movable body 3 in the axial line direction. When a power supply to the coil 62 is cut off, the movable body 3 is returned to a home position by a return force of the connection body 10. Therefore, when a power supply to the coil 62 is intermittently performed, the movable body 3 is vibrated in the axial line direction. Further, when an AC waveform applied to the coil 62 is adjusted, acceleration of the movable body 3 which is moved to one side "L1" in the axial line direction and acceleration of the movable body 3 which is moved to the other side "L2" in the axial line direction are able to be set different from each other. Therefore, a person who holds an apparatus to which the actuator 1 is attached as a tactile device by hand is capable of bodily sensing vibration with directivity in the axial line direction. Further, a loudspeaker is able to be structured by utilizing the actuator 1.

In this embodiment, the connection body 10 is disposed at a position where the support body 2 and the movable body 3 face each other in the radial direction, and the movable body 3 vibrates in the axial line direction. When the movable body 3 is vibrated in the axial line direction with respect to the support body 2, the first connection body 11 and the second connection body 12 are deformed in a shearing direction by following a vibration of the movable body 3. A gel state member such as silicone gel is provided with linear or nonlinear expansion and contraction characteristics according to its expansion and contraction direction. When a gel state member is deformed in a shearing direction, the gel state member has a deformation characteristic that a linear component is larger than a non-linear component. Therefore, when the movable body 3 is vibrated in the axial line direction with respect to the support body 2, the first connection body 11 and the second connection body 12 are deformed in a high linearity range and thus, a vibration characteristic whose linearity is satisfactory is able to be obtained.

As described above, the actuator 1 in this embodiment includes the support body 2, the movable body 3, the connection body 10 which is connected with the support body 2 and the movable body 3 and is provided with at least one of elasticity and viscoelasticity, and the magnetic drive mechanism 6 including the magnet 61 and the coil 62 and structured to relatively move the movable body 3 with respect to the support body 2. The movable body 3 includes the support shaft 30 which supports the magnet 61 on an inner peripheral side with respect to the support body 2, the tube-shaped part 333 which surrounds an outer peripheral side of the magnet 61, the first inner frame member 36 (first inner frame part) which surrounds an outer peripheral side of the support shaft 30 on one side "L1" in the axial line direction with respect to the tube-shaped part 333, and the second inner frame member 37 (second inner frame part) which surrounds an outer peripheral side of the support shaft 30 on the other side "L2" in the axial line direction with respect to the tube-shaped part 333. The support body 2 includes the first outer frame member 51 (first outer frame part) which faces the first inner frame member 36 in the radial direction, the second outer frame member 52 (second outer frame part) which faces the second inner frame member 37 in the radial direction, and the case 20 in a tube shape which surrounds the outer peripheral sides of the first outer frame member 51, the second outer frame member 52 and the tube-shaped part 333. The connection body 10 includes the first connection body 11 in a tube shape which is disposed in a space between the first inner frame member 36 and the first outer frame member 51, the second connection body 12 in a tube shape which is disposed in a space between the second inner frame member 37 and the second outer frame member 52, and the third connection body 13 in a tube shape which is disposed in a space between the tube-shaped part 333 and the case 20.

According to this embodiment, the connection body 10 which connects the movable body 3 with the support body 2 is disposed at two positions, i.e., on one side "L1" and the other side "L2" in the axial line direction with respect to the tube-shaped part 333 provided in the movable body 3 and, in addition, the connection body 10 is also disposed in a space between the tube-shaped part 333 and the case 20. Therefore, although the connection body 10 has been conventionally disposed at only two positions, i.e., at both ends in the axial line direction of the movable body 3, according to this embodiment, the connection body 10 is also disposed at an intermediate position in the axial line direction and thus, since the number of the connection bodies 10 is increased, each of the connection bodies 10 is hard to deform in a direction intersecting the axial line direction. Accordingly, a movement in a direction intersecting the axial line direction (vibration direction) of the movable body 3 is suppressed, and a loss of a drive force due to the movement of the movable body 3 in a direction intersecting the axial line direction (vibration direction) is able to be reduced. Further, a movement of the movable body 3 in a direction intersecting the axial line direction is reduced and, in addition, a collision of the tube-shaped part 333 with the case 20 is restricted by the third connection body 13 and thus, a collision of the movable body 3 with the support body 2 due to an impact such as dropping may be prevented. Therefore, the movable body and the support body are less likely to be damaged.

In the embodiment described above, the movable body 3 is disposed on an inner peripheral side with respect to the support body 2. However, in accordance with an embodiment of the disclosure, it may be structured that the movable body 3 is disposed on an outer peripheral side with respect to the support body 2. Further, in the embodiment described above, the magnetic drive mechanism 6 structured to vibrate the movable body 3 with respect to the support body 2 includes the magnet 61 disposed on the movable body 3 and the coil 62 disposed on the support body 2. However, in accordance with an embodiment of the disclosure, a structure whose arrangement of the magnet 61 and the coil 62 is reversed may be adopted. In other words, the magnetic drive mechanism 6 may be structured so that the magnet 61 is disposed on an outer peripheral side with respect to the coil 62. Further, it may be structured that the magnetic drive mechanism 6 includes a coil 62 disposed on the movable body 3 and a magnet 61 disposed on the support body 2.

Further, in the embodiment described above, the first inner frame member 36 and the second inner frame member 37 are members separately structured from the support shaft 30. However, the first inner frame member 36 and the second inner frame member 37 may be integrally structured with the support shaft 30. In other words, it is sufficient that the movable body 3 is provided with portions which function as the first inner frame part and the second inner frame part whose outer peripheral faces are joined with the connection bodies 10. Further, the first outer frame member 51 may be integrally structured with the coil holder 4, and the second outer frame member 52 may be integrally structured with the case 20. In other words, it is sufficient that the support body 2 is provided with portions which function as the first outer frame part and the second outer frame part whose inner peripheral faces are joined with the connection bodies 10.

In the embodiment described above, thicknesses in the radial direction of the first connection body 11, the second connection body 12 and the third connection body 13 are the same as each other and thus, durability is equal. In accordance with an embodiment of the disclosure, it is not required that thicknesses in the radial direction of the first connection body 11, the second connection body 12 and the third connection body 13 are the same as each other. However, it is preferable that dimensions of their thicknesses are set close to the same as each other. When variations of thicknesses in the radial direction of a plurality of connection bodies 10 are reduced, variations in durability of a plurality of the connection bodies 10 are able to be avoided. Further, when thicknesses in the radial direction of a plurality of connection bodies 10 are made the same as each other, vibration characteristics are able to be uniformed. Therefore, vibration characteristics of the movable body 3 may be easily adjusted to a desired value.

In the embodiment described above, the position in the axial line direction of the third connection body 13 includes the middle point "P" between an end on the other side "L2" in the axial line direction of the first connection body 11 and an end on one side "L1" in the axial line direction of the second connection body 12. According to this structure, three connection bodies 10 are able to be equally disposed in the axial line direction. Therefore, a difference in vibration characteristics between a time when the movable body 3 is moved to one side "L1" in the axial line direction and a time when the movable body 3 is moved to the other side "L2" is able to be reduced. Accordingly, a characteristic difference due to a difference of directions that the movable body 3 is moved is able to be reduced or eliminated.

In the embodiment described above, as shown in FIGS. 3 and 4, a center in the axial line direction of the third connection body 13 is shifted from the middle point "P" between an end on the other side "L2" of the first connection body 11 and an end on one side "L1" of the second connection body 12. However, when the center in the axial line direction of the third connection body 13 and the middle point "P" are disposed so as to coincide with each other, the first connection body 11, the second connection body 12 and the third connection body 13 are able to be disposed at equal intervals in the axial line direction. In this case, a characteristic difference due to a difference of directions that the movable body 3 is moved is able to be reduced or eliminated.

Further, in the embodiment described above, the connection body 10 is disposed at three positions, but the connection body 10 may be disposed at four or more positions. For example, in addition to the three positions described in the embodiment described above, a connection body 10 may be disposed in a space in the radial direction between the body part 42 of the coil holder 4 and an outer peripheral face of the first yoke 31.

In the embodiment described above, a length in the axial line direction of the third connection body 13 is the same as a length in the axial line direction of the tube-shaped part 333. According to this structure, a length in the axial line direction of the third connection body 13 is able to be increased as long as possible. As a length in the axial line direction of the third connection body 13 is made longer, the third connection body 13 is hard to be deformed in a direction intersecting the axial line direction. Therefore, a movement of the movable body 3 in a direction intersecting the axial line direction (vibration direction) is able to be suppressed.

In the embodiment described above, one of the movable body 3 and the support body 2 includes the magnet 61 fixed to an outer peripheral face of the support shaft 30 and the yoke 35 structuring a magnetic circuit. Further, the yoke 35 is provided with the end plate part 331 which is fixed to an end face in the axial line direction of the magnet 61, the bent part 332 which is provided at an outer peripheral edge of the end plate part 331, and the tube-shaped part 333 which is extend from the bent part 332 to the magnet 61 side. According to this structure, the third connection body 13 is able to be disposed by utilizing a space between an outer peripheral face of the yoke 35 and an inner peripheral face of the case 20.

In the embodiment described above, each of the first connection body 11, the second connection body 12 and the third connection body 13 is a gel state member. A spring constant of a gel state member when deformed in a compression direction is about three times of a spring constant when deformed in a shearing direction. Therefore, the spring constant when the movable body 3 is moved in a direction intersecting the axial line direction is larger than the spring constant when the movable body 3 is vibrated in the axial line direction and thus, the movable body 3 is able to be restrained from moving in a direction different from the vibration direction.

In the embodiment described above, the first connection body 11, the second connection body 12 and the third connection body 13 are gel state members having the same characteristics. However, characteristics of these three gel state members may be different from each other. For example, it may be structured that the first connection body 11 and the second connection body 12 are gel state members having the same characteristics and the third connection body 13 is a gel state member having different characteristics from the first connection body 11 and the second connection body 12. For example, in a case that a thickness "T2" in the radial direction of the third connection body 13 and a thickness "T1" in the radial direction of the first connection body 11 and the second connection body 12 are different from each other, vibration characteristics are able to be matched each other by changing a characteristic of a gel state member.

According to at least one embodiment of the disclosure, there may be provided an actuator including a support body, a movable body, a connection body which is connected with the support body and the movable body and is provided with at least one of elasticity and viscoelasticity, and a magnetic drive mechanism which includes a magnet and a coil and is structured to relatively move the movable body with respect to the support body. One of the movable body and the support body includes a support shaft which supports one of the magnet and the coil on an inner peripheral side with respect to the other of the movable body and the support body, a tube-shaped part which surrounds an outer peripheral side of the one of the magnet and the coil, a first inner frame part which surrounds an outer peripheral side of the support shaft on one side in an axial line direction of the tube-shaped part, and a second inner frame part which surrounds the outer peripheral side of the support shaft on the other side in the axial line direction of the tube-shaped part. The other of the movable body and the support body includes a first outer frame part which faces the first inner frame part in a radial direction, a second outer frame part which faces the second inner frame part in the radial direction, and a case in a tube shape which surrounds outer peripheral sides of the first outer frame part, the second outer frame part and the tube-shaped part. The connection body includes a first connection body in a tube shape which is disposed in a space between the first inner frame part and the first outer frame part, a second connection body in a tube shape which is disposed in a space between the second inner frame part and the second outer frame part, and a third connection body in a tube shape which is disposed in a space between the tube-shaped part and the case.

According to at least one embodiment of the disclosure, one of a movable body and a support body includes a tube-shaped part which surrounds an outer peripheral side of a magnet or a coil which is supported by a support shaft, and the other of the movable body and the support body includes a case in a tube shape which surrounds an outer peripheral side of the tube-shaped part. The connection body is disposed at two positions, i.e., on one side and the other side in the axial line direction with respect to the tube-shaped part and, in addition, the connection body is also disposed in a space between the tube-shaped part and the case. As described above, since the number of the connection bodies is increased, each of the connection bodies is hard to be deformed in a direction intersecting the axial line direction. Therefore, a movement of the movable body in a direction intersecting the axial line direction (vibration direction) is suppressed, and a loss of a drive force due to the movement of the movable body in a direction intersecting the axial line direction (vibration direction) is able to be reduced. Further, a movement of the movable body in a direction intersecting the axial line direction is reduced and, in addition, a collision of the tube-shaped part with the case is restricted by the third connection body and thus, a collision of the movable body with the support body due to an impact such as dropping may be prevented. Therefore, the movable body and the support body are less likely to be damaged.

In the disclosure, it is preferable that thicknesses in the radial direction of the first connection body, the second connection body and the third connection body are the same as each other. According to this structure, variations in durability of three connection bodies are able to be avoided. Further, when thicknesses in the radial direction of the connection bodies are set the same as each other, vibration characteristics are able to be uniformed. Therefore, vibration characteristics of the movable body are able to be easily adjusted to a desired value.

In the disclosure, it is preferable that a position in the axial line direction of the third connection body includes a middle point between an end on the other side in the axial line direction of the first connection body and an end on the one side in the axial line direction of the second connection body. According to this structure, three connection bodies are able to be substantially equally disposed in the axial line direction. Therefore, a difference in vibration characteristics between a time when the movable body is moved to one side in the axial line direction and a time when the movable body is moved to the other side is able to be reduced. Accordingly, a characteristic difference due to a difference of directions that the movable body is moved is able to be reduced or eliminated.

In the disclosure, it is preferable that a length in the axial line direction of the third connection body is the same as a length in the axial line direction of the tube-shaped part. According to this structure, a length in the axial line direction of the third connection body is able to be increased as long as possible. As a length in the axial line direction of the third connection body is made longer, the third connection body is hard to deform in a direction intersecting the axial line direction. Therefore, a movement of the movable body in a direction intersecting the axial line direction (vibration direction) is able to be suppressed.

In the disclosure, it is preferable that one of the movable body and the support body includes the magnet fixed to the outer peripheral face of the support shaft and a yoke structuring the magnetic circuit, and the yoke includes an end plate part which is fixed to an end face in the axial line direction of the magnet, a bent part which is provided at an outer peripheral edge of the end plate part, and the tube-shaped part which is extended from the bent part to a side of the magnet. According to this structure, the third connection body is able to be disposed by utilizing a space between an outer peripheral face of the yoke and an inner peripheral face of the case.

In the disclosure, it is preferable that each of the first connection body, the second connection body and the third connection body is a gel state member. A spring constant of a gel state member when deformed in a compression direction is about three times of a spring constant when deformed in a shearing direction. Therefore, the spring constant when the movable body is moved in a direction intersecting the axial line direction is larger than the spring constant when the movable body is vibrated in the axial line direction and thus, the movable body is able to be restrained from moving in a direction different from the vibration direction.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. An actuator comprising:
a support body;
a movable body;
a connection body connected with the support body and the movable body and provided with at least one of elasticity and viscoelasticity; and
a magnetic drive mechanism comprising a magnet and a coil and structured to relatively move the movable body with respect to the support body;
wherein one of the movable body and the support body comprises:
a support shaft supporting one of the magnet and the coil on an inner peripheral side with respect to an other of the movable body and the support body;
a tube-shaped part surrounding an outer peripheral side of the one of the magnet and the coil;
a first inner frame part surrounding an outer peripheral side of the support shaft on one side in an axial line direction of the tube-shaped part; and
a second inner frame part surrounding the outer peripheral side of the support shaft on an other side in the axial line direction of the tube-shaped part;
wherein the other of the movable body and the support body comprises:
a first outer frame part facing the first inner frame part in a radial direction;

a second outer frame part facing the second inner frame part in the radial direction; and a case in a tube shape surrounding outer peripheral sides of the first outer frame part, the second outer frame part and the tube-shaped part; and wherein the connection body comprises:

a first connection body in a tube shape disposed in a space between the first inner frame part and the first outer frame part;

a second connection body in a tube shape disposed in a space between the second inner frame part and the second outer frame part; and a third connection body in a tube shape disposed in a space between the tube-shaped part and the case, wherein thicknesses in the radial direction of the first connection body, the second connection body, and the third connection body are same as each other, wherein a position in the axial line direction of the third connection body comprises a middle point between an end on the other side in the axial line direction of the first connection body and an end on the one side in the axial line direction of the second connection body.

2. The actuator according to claim 1, wherein a length in the axial line direction of the third connection body is same as a length in the axial line direction of the tube-shaped part.

3. The actuator according to claim 1, wherein the one of the movable body and the support body comprises the magnet fixed to an outer peripheral face of the support shaft and a yoke structuring a magnetic circuit, and the yoke comprises an end plate part fixed to an end face in the axial line direction of the magnet, a bent part provided at an outer peripheral edge of the end plate part, and the tube-shaped part extended from the bent part to a side of the magnet.

4. The actuator according to claim 1, wherein each of the first connection body, the second connection body and the third connection body is a gel state member.

* * * * *